US012779968B2

(12) United States Patent
Kim

(10) Patent No.: US 12,779,968 B2
(45) Date of Patent: Nov. 3, 2026

(54) VEHICLE MOUNT AND A METHOD OF MANUFACTURING THE SAME

(71) Applicants: HYUNDAI MOTOR COMPANY, Seoul (KR); KIA CORPORATION, Seoul (KR)

(72) Inventor: Seung Won Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 288 days.

(21) Appl. No.: 18/229,718

(22) Filed: Aug. 3, 2023

(65) Prior Publication Data

US 2024/0351414 A1 Oct. 24, 2024

(30) Foreign Application Priority Data

Apr. 21, 2023 (KR) ........................ 10-2023-0052862

(51) Int. Cl.
*B60K 1/00* (2006.01)
*F16F 1/38* (2006.01)

(52) U.S. Cl.
CPC ...................................... *B60K 1/00* (2013.01)

(58) Field of Classification Search
CPC ... B60K 1/00; F16F 1/38; F16F 1/3842; F16F 1/3849; F16F 1/3856; F16F 1/3863; F16F 1/387; F16F 1/3873; F16F 1/3876
See application file for complete search history.

(56) References Cited

U.S. PATENT DOCUMENTS 11,390,153 B2 7/2022 Cho et al.
11,760,186 B2 * 9/2023 Cho ........................ F16F 15/08 267/140.13
11,927,234 B2 * 3/2024 Kadowaki ................ B60K 5/12
2008/0136135 A1 * 6/2008 Maciak ............. B62D 33/0604 280/124.1
2017/0167559 A1 * 6/2017 Kim ...................... F16F 1/3842
2022/0153114 A1 5/2022 Cho et al.
2023/0296153 A1 * 9/2023 Taniguchi ............ F16F 1/3821 267/140.11

FOREIGN PATENT DOCUMENTS

KR 102244990 B1 5/2021

* cited by examiner

*Primary Examiner* — John D Walters
(74) *Attorney, Agent, or Firm* — Lempia Summerfield Katz LLC

(57) ABSTRACT

A vehicle mount having a new structure capable of improving assembly performance, durability, and dynamic characteristics, and a method of manufacturing the vehicle mount. The vehicle mount includes: an inner pipe coupled to a vehicle-mounted device; an outer pipe disposed outside the inner pipe and coupled to a vehicle body side portion; and an insulator interposed between the inner pipe and the outer pipe. The inner pipe has a flat portion formed at an upper outer surface thereof. The upper outer surface having a flat horizontal surface and being coupled to the insulator.

17 Claims, 12 Drawing Sheets

FIG. 1 – Prior Art

FIG. 2 – Prior Art

FIG. 3 – Prior Art

VEHICLE MOUNT AND A METHOD OF MANUFACTURING THE SAME

CROSS-REFERENCE TO RELATED APPLICATION

This application claims the benefit of and priority to Korean Patent Application No. 10-2023-0052862, filed on Apr. 21, 2023, the entire contents of which are incorporated herein by reference.

BACKGROUND

(a) Technical Field

The present disclosure relates to a vehicle mount and a method of manufacturing the same. More particularly, it relates to a vehicle mount capable of mounting a vehicle-mounted device such as a motor forming a power electric (PE) system of an electric vehicle on a vehicle body in a vibration-insulated manner and a method of manufacturing the same.

(b) Background Art

In general, when a power train including an engine and a transmission of a vehicle having an internal combustion engine is mounted in an engine room, mounting is performed using a mount in order to reduce vibration and noise transmitted from the power train to a vehicle body.

For example, when an engine is driven, an engine mount plays a crucial role in insulating vibration generated by the stroke of a piston and the rotational torque of a crankshaft between a vehicle body and the engine mount.

In this regard, while a vehicle having an internal combustion engine has an engine mounted therein, an electric vehicle adopts a power electric (PE) system including a motor and a reducer. Accordingly, when the motor and the reducer are mounted on the vehicle body side portion in a PE room, mounting is performed using a dedicated mount for an electric vehicle. The vehicle mount for an electric vehicle is capable of insulating gear whine noise, shock, jerk vibration, and the like.

Since the weight of the motor and the reducer forming the PE system of the electric vehicle is smaller than that of the engine (internal combustion engine), the electric vehicle generally uses a conventional rubber-type mount as a mount for the PE system (hereinafter referred to as a "PE mount") instead of using a hydro-type mount.

As shown in FIGS. 1 and 2, a PE mount 1 includes an inner pipe (also referred to as an "inner core") 2 coupled to a vehicle-mounted device such as a motor or a reducer forming the PE system. The PE mount also includes a rubber (also referred to as an "insulator") 3 vulcanized and molded into a predetermined shape on the outer diameter of the inner pipe 2. Furthermore, the PE mount includes an outer pipe 4 integrally coupled to the outer surface of the rubber 3.

Among the components of the PE mount described above, the rubber 3 serves to insulate vibration transmitted through the inner pipe 2 from a motor and a reducer, thereby preventing the vibration from being transmitted to the outer pipe 4.

FIG. 3 is a perspective view showing a state in which a motor 7 is mounted on a subframe 5 using the PE mount 1. As shown in FIG. 3, the outer pipe 4 of the PE mount 1 is press-fitted into a mounting hole 6*a* of a bracket 6, which is a vehicle body side portion. The bracket 6 may be a structure separately installed on the vehicle body side portion such as the subframe 5 on which the motor 7 and the reducer are mounted. Alternatively, the bracket 6 may be an integrally formed vehicle body side portion.

During assembly, in a state in which a coupling hole (not shown) of a boss 8*a* formed to be integrated with a motor housing 8 is aligned with a shaft insertion hole (inner space of the inner pipe) 2*a* of the mount 1, a bolt 9 is inserted to pass through the inner side of the inner pipe 2. The end of the bolt 9 is screwed into the inner circumferential surface of the coupling hole of the boss 8*a*.

As a result, when the motor 7 and the reducer of the electric vehicle are mounted on the vehicle body side portion, such as the subframe 5, by the mount 1 as described above, the noise insulation performance, particularly against gear whine noise, generated by the motor and the reducer, may be significantly enhanced. This improvement is attributed to the lower dynamic characteristics of the rubber 3 disposed in the mount.

When an electric vehicle is started, excessive shock and jerk occur according to driving of the motor 7 and the reducer. In this case, as the dynamic characteristics of the rubber 3 disposed in the mount 1 are higher, it is more advantageous to insulate shock and jerk vibration.

Accordingly, considering that the rubber dynamic characteristics related to insulation of gear whine noise and the rubber dynamic characteristics related to insulation of shock and jerk vibration are different from each other, the rubber characteristics of a mount are tuned to an intermediate stiffness value.

In recent years, research and development have been actively conducted on a platform dedicated to an electric vehicle. The number of parts in the PE room is reduced as much as possible, thereby achieving assembly performance improvement, cost reduction, weight reduction, and system robustness.

To this end, most of the PE mounts in the next-generation platform are provided with a structure capable of being press-fitted to a vehicle body side portion such as a subframe. In this case, aligning holes during the assembly of the PE system can pose a challenge.

Referring to FIG. 3, the mount 1 is first installed so that the outer pipe 4 is press-fitted into the mounting hole 6*a* of the bracket 6, which is a vehicle body side portion. Then, the vertical height of the motor 7 and the left and right positions thereof are adjusted to accurately align the coupling hole (not shown) of the boss 8*a* having the bolt 9 inserted thereinto and coupled thereto in the motor housing 8 with the shaft insertion hole 2*a* of the inner pipe 2 provided in the mount 1. Thereafter, the bolt 9 passes through the shaft insertion hole 2*a* of the inner pipe 2 provided in the mount 1, and the bolt 9 is screwed into the inner circumferential surface of the coupling hole of the boss 8*a*.

As described above, in a state in which the height of the coupling hole formed in the boss 8*a* of the motor housing 8 is aligned with the height of the shaft insertion hole 2*a* of the inner pipe 2, which is the hole of the mount 1, the bolt 9 passes through the shaft insertion hole 2*a* of the inner pipe 2 of the mount 1. Then, the end of the bolt 9 is screwed into the inner circumferential surface of the coupling hole of the boss 8*a*. In this case, it is difficult to align the coupling hole of the boss 8*a* with the shaft insertion hole 2*a* of the mount 1 by adjusting the height and the position of the motor housing 8. Further, the difficulty in aligning the two holes presents a disadvantage in terms of assembly performance.

In addition, rotation of the rubber (insulator) 2 due to the torque load of the bolt 9 causes a durability problem. In this case, dynamic characteristics of the rubber become high and whine noise increases.

Although the bolt is not shown in FIGS. 1 and 2, the bolt 9 is inserted into the shaft insertion hole 2*a* of the inner pipe 2, which is the hole of the mount 1. Subsequently, the bolt 9 is screwed into the inner circumferential surface of the coupling hole of the motor housing 8, and a torque load is applied through the bolt 9. In this case, the rubber (insulator) 2 is rotated as shown by the arrow in FIG. 1, which causes deterioration in durability and characteristics.

When assembling with a bolt, the outer pipe 4 is not rotated because the outer pipe 4 is strongly press-fitted into the mounting hole 6*a* formed on the vehicle body side portion such as the bracket 6 of the subframe 5. However, when the inner pipe 2 is rotated with the bolt 9, the rubber 3 is also rotated in the same direction.

As a result, a difference in relative position between the inner pipe 2 and the outer pipe 4 may occur, so that the rubber 3 may be forcibly under tension. Due to the forced tension of the rubber 3, the dynamic characteristics of the rubber increase and the durability thereof deteriorates.

In addition, as shown in FIG. 1, the rubber 3 has a symmetrical structure so that the top of the rubber 3 and the bottom thereof are symmetrical and the left side of the rubber 3 and the right side thereof are symmetrical. Accordingly, a resonance mode of the rubber is operated as one mode, and the resonance of the rubber increases, which inevitably causes deterioration in high-frequency dynamic characteristics.

Particularly, regarding whine noise, high-frequency dynamic characteristics in the Z direction (vertical direction) in which a load is applied are important in the mount 1. In the conventional mount, the inner pipe (inner core) 2 has a symmetrical shape in the vertical and horizontal directions. However, some shapes of the inner pipe 2 are not symmetrical and are provided to distinguish between the top of the inner pipe 2 and the bottom thereof during assembly. Further, since the bridge shape of the rubber 3 is the same, all resonances of the rubber occur at the same frequency. Therefore, since the resonance energy increases and the dynamic characteristics increase, there is a disadvantage in terms of whine noise insulation.

In order to improve high-frequency dynamic characteristics of an existing mount, an aluminum die-casting type inner pipe is used to lower a resonance point of rubber and improve the dynamic characteristics. However, this configuration is disadvantageous because the cost and weight increases.

The above information disclosed in this Background section is only to enhance understanding of the background of the disclosure. Therefore, the Background section may contain information that does not form the prior art that is already known in this country to a person of ordinary skill in the art.

SUMMARY

The present disclosure has been made in an effort to solve the above-described problems associated with the prior art. It is an object of the present disclosure to provide a mount having a new structure capable of simultaneously improving assembly performance, durability, and dynamic characteristics. Furthermore, another object of the present disclosure to provide a method of manufacturing the same.

The objects of the present disclosure are not limited to the above-mentioned objects, and other technical objects not mentioned herein should be clearly understood by those having ordinary skill in the art to which the present disclosure pertains (referred to hereinafter as "the person skilled in the art") from the detailed description of the embodiments.

In one aspect, the present disclosure provides a vehicle mount including an inner pipe coupled to a vehicle-mounted device. The vehicle mount also includes an outer pipe disposed outside the inner pipe and coupled to a vehicle body side portion. Furthermore, the vehicle mount includes an insulator interposed between the inner pipe and the outer pipe. The inner pipe has a flat portion formed at an upper outer surface thereof. The upper outer surface having a flat horizontal surface and being coupled to the insulator.

In an embodiment, the inner pipe may be provided in a hollow pipe shape with a circular cross shape. An upper outer surface section corresponding to the flat portion in a cross-sectional shape of the inner pipe may be a horizontal straight section.

In another embodiment, the inner pipe may have a shaft insertion hole formed to pass therethrough in an axial direction of the inner pipe. The shaft insertion hole may allow a bolt coupled to the vehicle-mounted device to pass therethrough.

In still another embodiment, the inner pipe may have a plurality of pipe through-holes disposed around the shaft insertion hole in cross-section. The plurality of pipe through-holes may be formed to pass through the inner pipe in the axial direction of the inner pipe.

In yet another embodiment, the vehicle-mounted device may have a coupling hole formed in a coupling part thereof. The coupling part serves as a mounting portion of the vehicle-mounted device. The coupling hole may allow an end of the bolt passing through the shaft insertion hole of the inner pipe to be inserted and screwed thereinto.

In still yet another embodiment, the flat portion of the inner pipe may have an end exposed to an outside of the insulator.

In a further embodiment, the vehicle-mounted device may have a locking jaw part formed at a portion above the coupling hole configured to allow the bolt to be coupled thereto in a coupling part serving as a mounting portion. The locking jaw part may be formed to protrude so as to be locked downwards on the exposed end of the flat portion.

In another further embodiment, the locking jaw part may be formed at a portion above a coupling surface of the coupling part and formed to protrude toward the mount. The coupling surface may allow an end surface of the inner pipe to be seated thereon and to be in contact therewith, and the locking jaw part may have a lower surface formed as a horizontal surface. The lower surface may be locked downwards on an upper surface of the exposed end of the flat portion in a state of being seated on the upper surface.

In still another further embodiment, the coupling surface of the coupling part may be formed as a vertical surface perpendicular to the lower surface of the locking jaw part.

In yet another further embodiment, the vehicle-mounted device may be a motor configured to drive a vehicle.

In another aspect, the present disclosure provides a method of manufacturing a vehicle mount. The method includes providing an inner pipe coupled to a vehicle-mounted device and an outer pipe coupled to a vehicle body side portion. The method also includes integrally forming, by vulcanization molding, an insulator interposed between the inner pipe and the outer pipe in a state in which the outer pipe is disposed outside the inner pipe. The inner pipe is manufactured to have a flat portion formed at an upper outer surface thereof. The upper outer surface has a flat horizontal surface and is coupled to the insulator.

In an embodiment, the inner pipe may be manufactured by extrusion molding.

In another embodiment, the inner pipe may be manufactured in a hollow pipe shape with a circular cross shape. An upper outer surface section corresponding to the flat portion in a cross-sectional shape of the inner pipe may be manufactured to be a horizontal straight section.

In still another embodiment, a shaft insertion hole may be formed to pass through the inner pipe in an axial direction of the inner pipe. The shaft insertion hole may allow a bolt coupled to the vehicle-mounted device to pass therethrough.

In yet another embodiment, a plurality of pipe through-holes disposed around the shaft insertion hole in cross-section may be formed in the inner pipe. The plurality of pipe through-holes may be formed to pass through the inner pipe in the axial direction of the inner pipe.

In still yet another embodiment, the insulator may be molded so that an upper surface of an end of the flat portion of the inner pipe is exposed to an outside of the insulator. A locking jaw part of the vehicle-mounted device may be locked downwards on the upper surface of the end of the flat portion in a state of being seated and supported on the upper surface.

Other aspects and embodiments of the disclosure are discussed below.

It is understood that the terms "vehicle," "vehicular," and other similar terms as used herein are inclusive of motor vehicles in general. Such motor vehicles may encompass passenger automobiles including sport utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example vehicles that are powered by both gasoline and electricity.

The above and other features of the disclosure are discussed below.

BRIEF DESCRIPTION OF THE DRAWINGS

The above and other features of the present disclosure will now be described in detail with reference to certain embodiments thereof illustrated in the accompanying drawings which are given hereinbelow by way of illustration only, and thus are not limitative of the present disclosure, and wherein.

Figure 1:
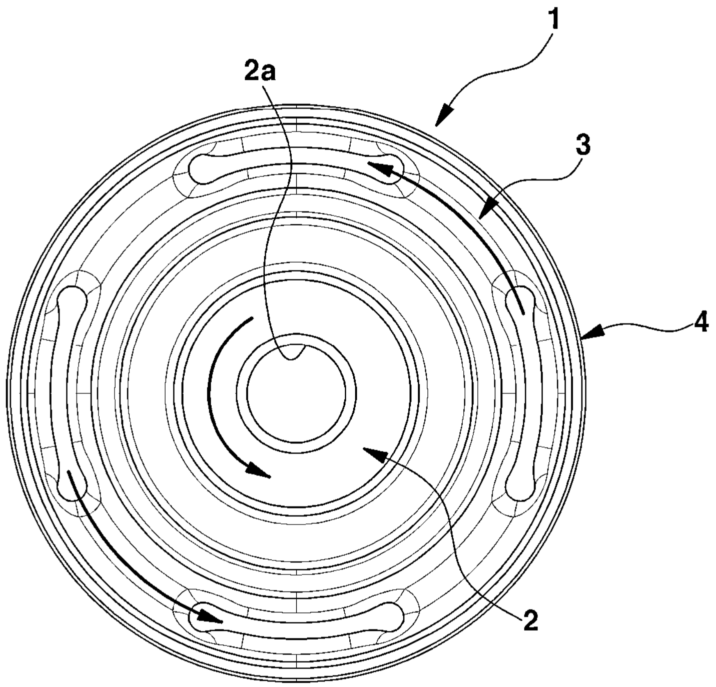
FIGS. 1 and 2 are views showing a conventional mount.
Figure 2:
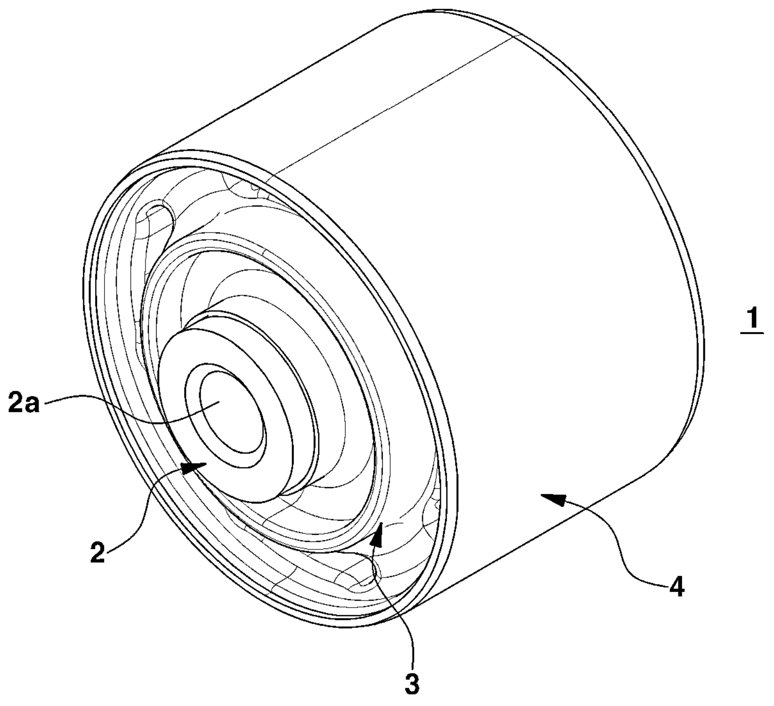
Figure 3:
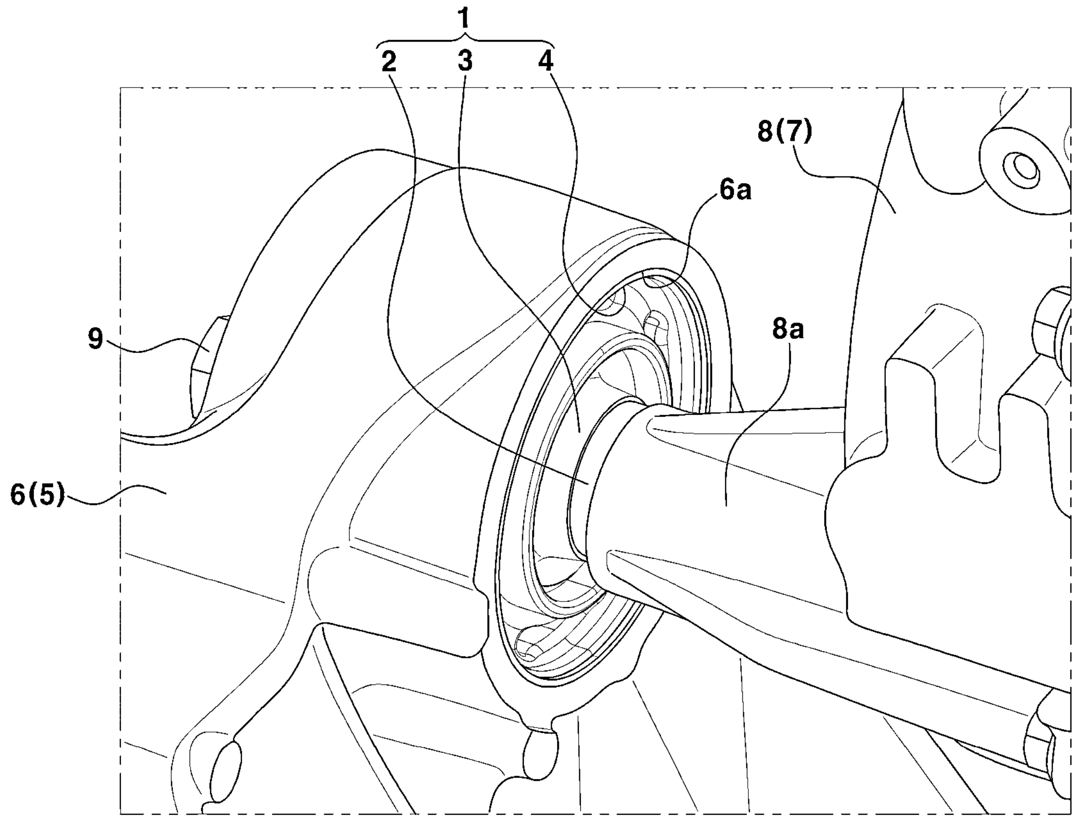
FIG. 3 is a perspective view showing a state in which a motor is mounted on a subframe using a conventional PE mount.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, embodiments of the present disclosure are described in detail with reference to the accompanying drawings. Specific structural or functional descriptions made in connection with the embodiments of the present disclosure are merely illustrative for the purpose of describing embodiments according to the concept of the present disclosure, and the embodiments according to the concept of the present disclosure may be implemented in various forms. Further, it should be understood that the present description is not intended to limit the disclosure to the embodiments. On the contrary, the disclosure is intended to cover not only the embodiments, but also various alternatives, modifications, equivalents, and other embodiments, which may be included within the spirit and scope of the disclosure as defined by the appended claims.

In the present disclosure, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concept of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that other components are not present therebetween. Other expressions for the description of relationships between components, that is, "between" and "directly between" or "adjacent to" and "directly adjacent to", should be interpreted in the same manner.

The same reference numerals represent the same components throughout the specification. Additionally, the terms in the specification are used merely to describe embodiments and are not intended to limit the present disclosure. In this specification, an expression in a singular form also includes a plural form, unless otherwise clearly specified in context. As used herein, expressions such as "comprise" and/or "comprising" do not exclude the presence or addition of one or more components, steps, operations, and/or elements other than those described.

The present disclosure relates to a vehicle mount and a method of manufacturing the same. Specifically, the present disclosure relates to a bushing-type mount capable of being used in an electric vehicle and a method of manufacturing the same. In detail, the mount according to the present disclosure may be a power electronic (PE) mount configured to mount a PE system including a motor and a reducer on a vehicle body side portion such as a subframe in an electric vehicle.

More specifically, the mount according to the present disclosure may be a motor mount configured to mount a motor, which is a vehicle driving source in an electric vehicle, on a vehicle body side portion. The vehicle body side portion may be a bracket of a subframe, i.e., a bracket installed on the subframe of the vehicle body or formed to be integrated therewith.

Figure 4:
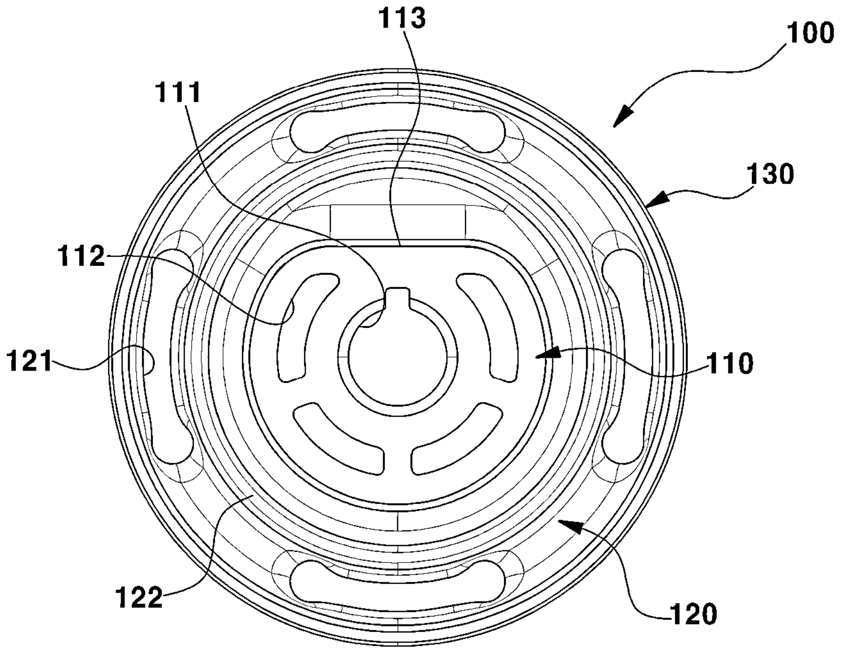
FIGS. 4 and 5 are views showing a mount according to an embodiment of the present disclosure.
Figure 5:
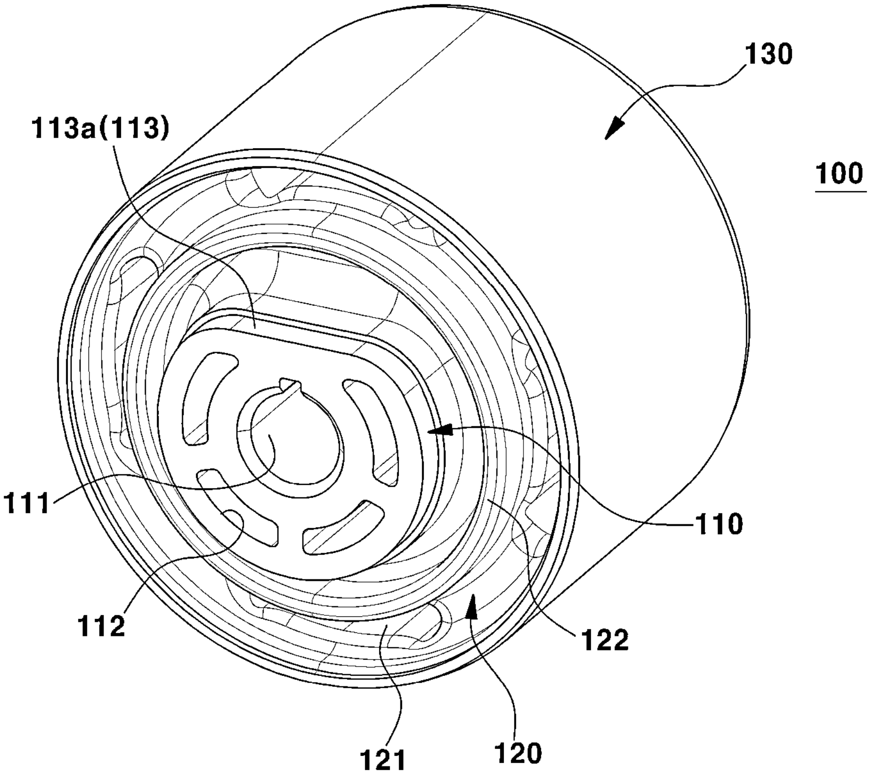
Figure 6:
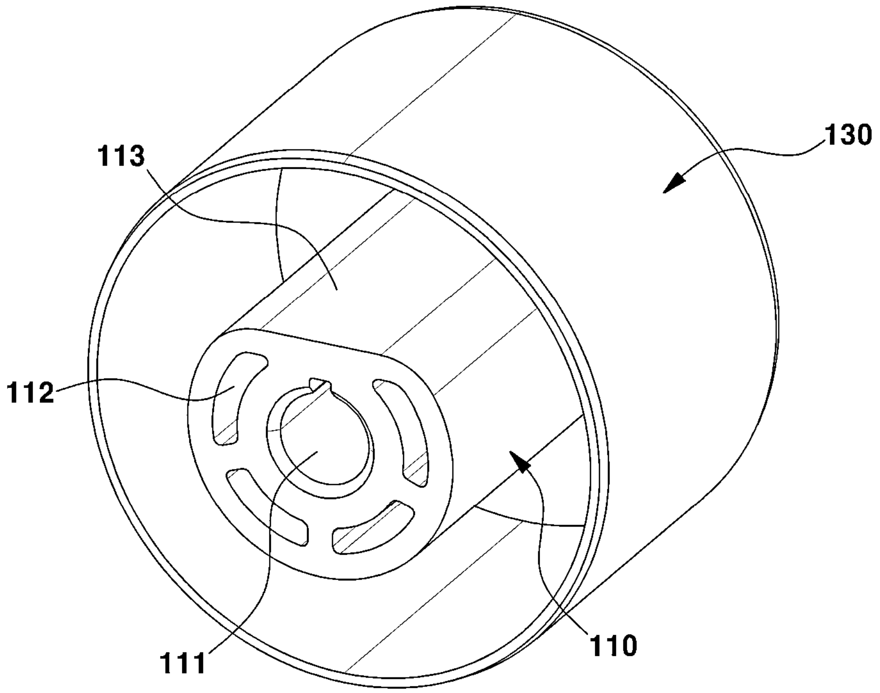
FIG. 6 is a perspective view showing an inner pipe and an outer pipe before vulcanization molding of an insulator in the mount according to the embodiment of the present disclosure.

FIGS. 4 and 5 are views showing a mount 100 according to the embodiment of the present disclosure. FIG. 6 is a perspective view showing an inner pipe 110 and the outer pipe 130 before vulcanizing an insulator made of rubber in the mount according to the embodiment of the present disclosure.

The mount 100 according to the embodiment of the present disclosure includes the inner pipe 110 coupled to a vehicle-mounted device such as a motor 10 or a reducer forming a PE system. The mount 100 also includes the outer pipe 130 disposed outside the inner pipe 110 and coupled to a vehicle body side portion 21. Additionally, the mount 100 includes an insulator 120 interposed between the inner pipe 110 and the outer pipe 130.

The inner pipe 110 is also referred to as an "inner core." The inner pipe 110 may be formed in a hollow pipe shape having a shaft insertion hole 111 formed at approximately the center of the cross-section thereof and configured to allow a bolt (reference numeral "30" in FIG. 11) to be inserted thereinto and pass therethrough. In the inner pipe 110, the shaft insertion hole 111 may be formed with a constant inner diameter in the longitudinal direction of the inner pipe and the axial direction thereof.

In the mount 100 according to the embodiment of the present disclosure, the inner pipe 110 has a constant cross-sectional shape. Accordingly, when the inner pipe 110 is manufactured by extrusion molding using an aluminum alloy as a material, cost reduction and weight reduction may be achieved.

The inner pipe 110 is formed in a pipe shape having a predetermined thickness around the shaft insertion hole 111 formed at the center of the cross-section. A plurality of pipe through-holes 112, may be formed around the shaft insertion hole 111 at the center of the inner pipe 110. Each of the pipe through-holes 112 has an arc shape cross-section.

The pipe through-holes 112 are disposed to form a circular shape around the shaft insertion hole 111 on the cross-section of the inner pipe 110. The pipe through-holes 112 may be formed to extend along an imaginary circle formed around the shaft insertion hole 111.

In this case, the pipe through-holes 112 are disposed to be spaced apart from each other at predetermined intervals around the shaft insertion hole 111 on the cross-section of the inner pipe (e.g., shaft) 110. Each of the pipe through-holes 112 may be formed to extend in parallel with the shaft insertion hole 111 in the axial direction of the inner pipe 110.

In the mount 100 according to the embodiment of the present disclosure, at least a part of an upper surface of the outer surface of the inner pipe 110, the upper surface being integrally coupled to the insulator 120, is formed as a flat horizontal surface. Accordingly, based on the cross-sectional shape of the inner pipe 110, an upper outer surface section of the inner pipe 110 forms a horizontal straight section instead of forming a circular section, as shown in FIG. 4.

As a result, the inner pipe 110, as shown in FIG. 6, may have a flat portion 113 with a predetermined area. As described above, the flat portion 113 is formed by allowing the upper outer surface of the inner pipe 110 to have a flat horizontal surface. Except for the flat portion 113 having the flat horizontal surface, the rest of the inner pipe 110 has a hollow pipe shape with a circular cross-section.

Figure 9:
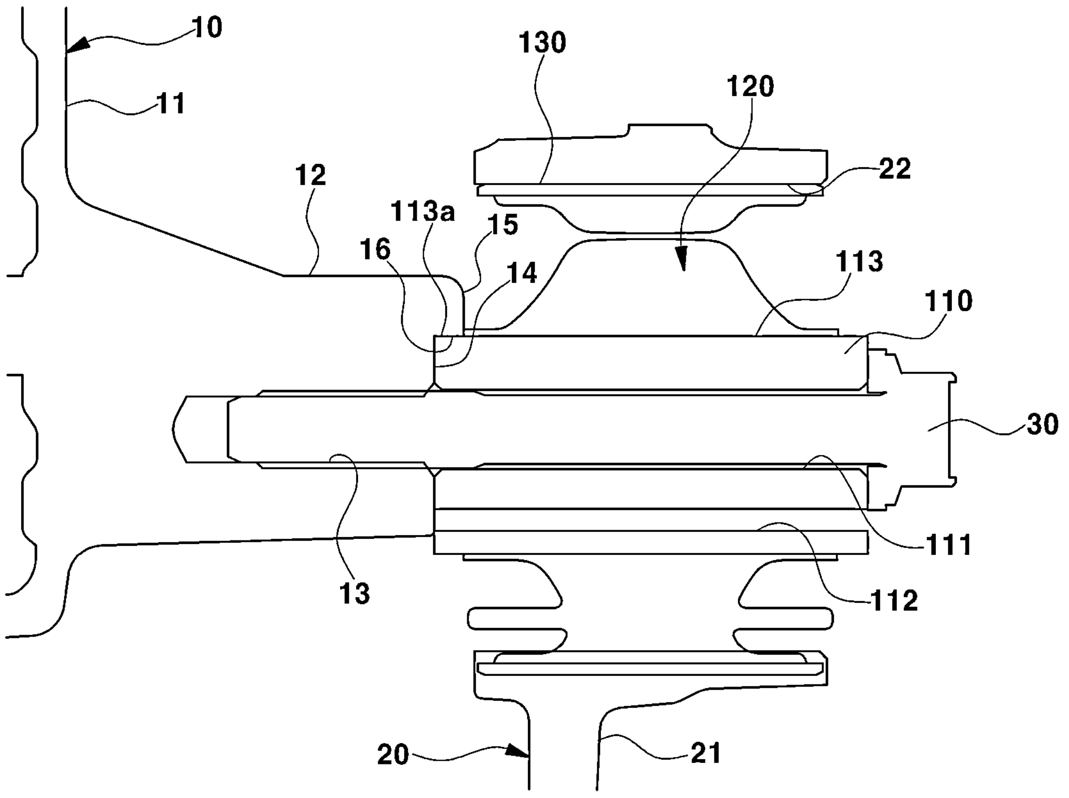
FIG. 9 is a cross-sectional view showing a state in which the mount according to the embodiment of the present disclosure and the vehicle-mounted device are coupled to each other by a bolt.
Figure 10:
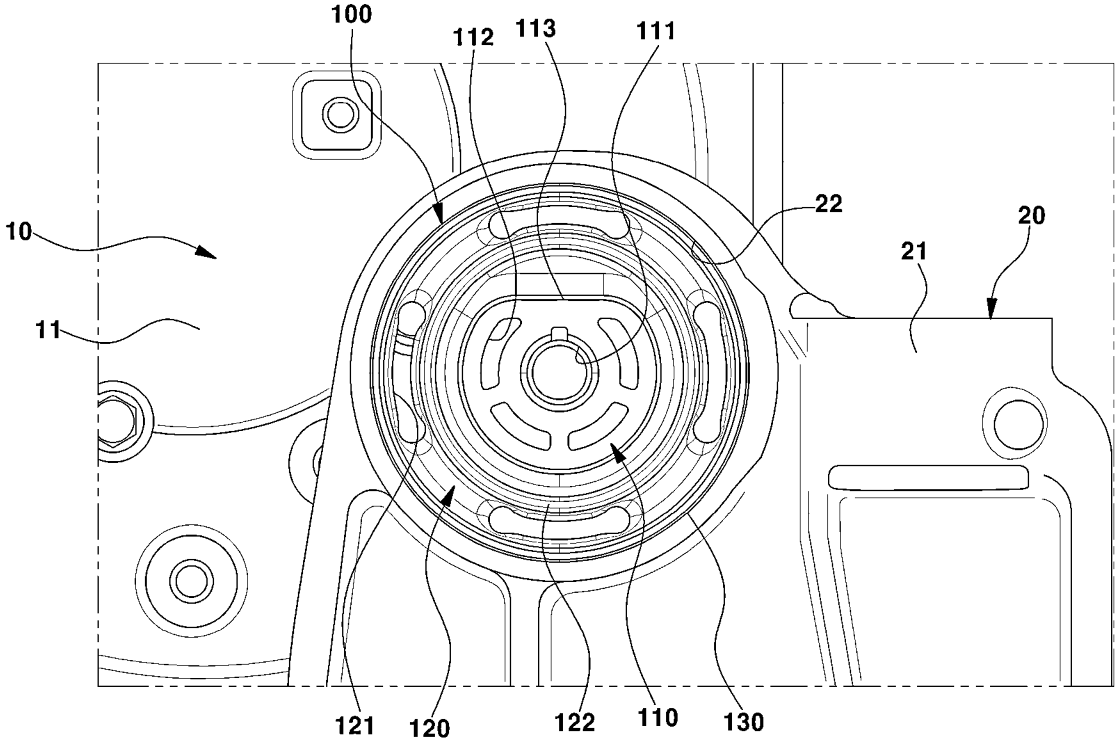
FIG. 10 is view showing a state in which the mount according to the embodiment of the present disclosure is press-fitted into a mounting hole of a vehicle body side portion.
Figure 11:
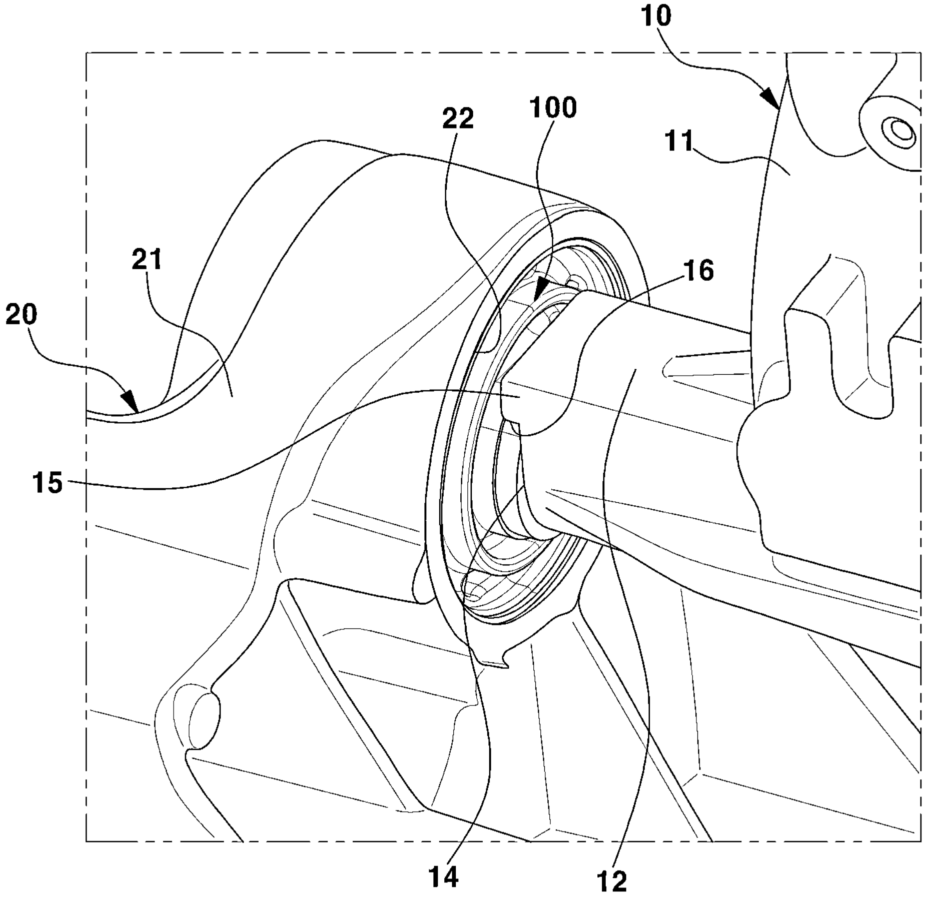
FIG. 11 is a perspective view showing a state in which the vehicle-mounted device is mounted on the vehicle body side portion using the mount according to the embodiment of the present disclosure.

In the mount 100 according to the embodiment of the present disclosure, the outer pipe 130 is provided with a circular cross-sectional shape. In detail, the outer pipe 130 is provided with a circular pipe shape having a predetermined diameter. The outer pipe 130 is capable of being pressed into and fixed to the inner circumferential surface of a mounting hole 22 of the vehicle body side portion 21, as depicted in FIGS. 9-11.

The insulator 120 is also referred to as "rubber." The insulator 120 may be formed by vulcanizing and molding rubber into a predetermined shape to be interposed between the inner pipe 110 and the outer pipe 130.

In the mount 100, the insulator 120 is a component configured to allow the inner pipe 110 and the outer pipe 130 to be integrally combined and fixed. Additionally, the insulator 120 is configured to perform a function of vibration insulation between the two pipes. Furthermore, the insulator 120 is integrally fixed to the outer surface of the inner pipe 110 and the inner circumferential surface of the outer pipe 130 by vulcanization molding.

In the present disclosure, the shape of the insulator 120 is not particularly limited, and the insulator 120 may be formed to have various shapes between the inner pipe 110 and the outer pipe 130. For example, FIG. 7 is a front view showing the mount 100 according to another embodiment of the present disclosure, and shows an embodiment in which the shape of the insulator 120 is different from that of FIG. 4.

In the embodiment of FIG. 4, the insulator 120 has a plurality of insulator through-holes 121 spaced apart from each other at regular intervals in the circumferential direction. A total of four insulator through-holes 121 are formed in the insulator 120 of the mount 100 and are respectively disposed in the upper, lower, left, and right sides of the insulator 120.

Figure 7:
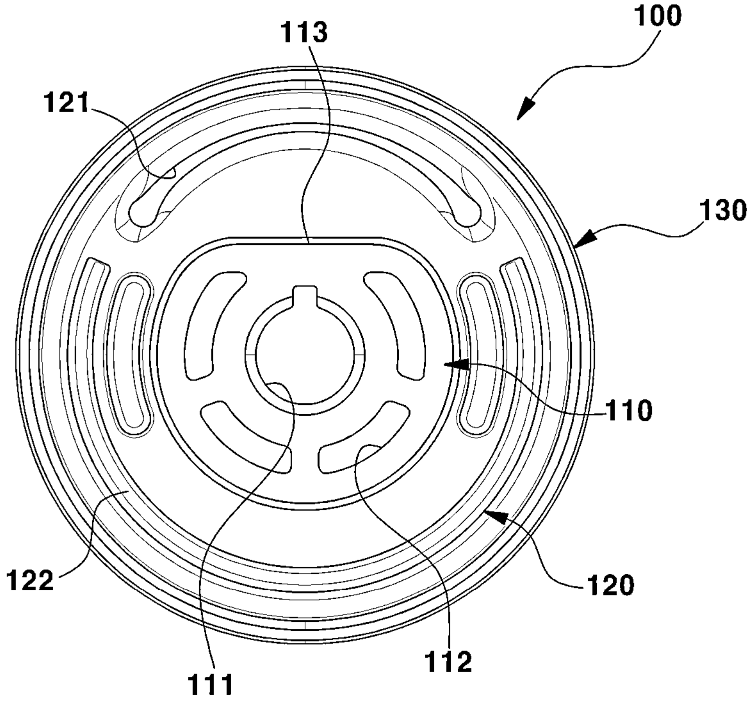
FIG. 7 is a front view showing a mount according to another embodiment of the present disclosure.

In the embodiment of FIG. 7, the insulator 120 has the insulator through-hole 121 formed only on the top thereof and formed to penetrate the same. The shapes of the inner pipe 110 and the outer pipe 130 are not different from those of the embodiment in FIG. 4. However, the shape of the insulator 120 is different from that of the embodiment in FIG. 4.

In FIGS. 4 and 7, reference numeral "122" denotes a flap, which is a protrusion formed on the end surfaces of the opposite ends in the axial direction of the insulator 120. The flap 122 may be formed to protrude around the shaft insertion hole 111 of the inner pipe 110 so as to have a circular shape extending in the circumferential direction.

Figure 8:
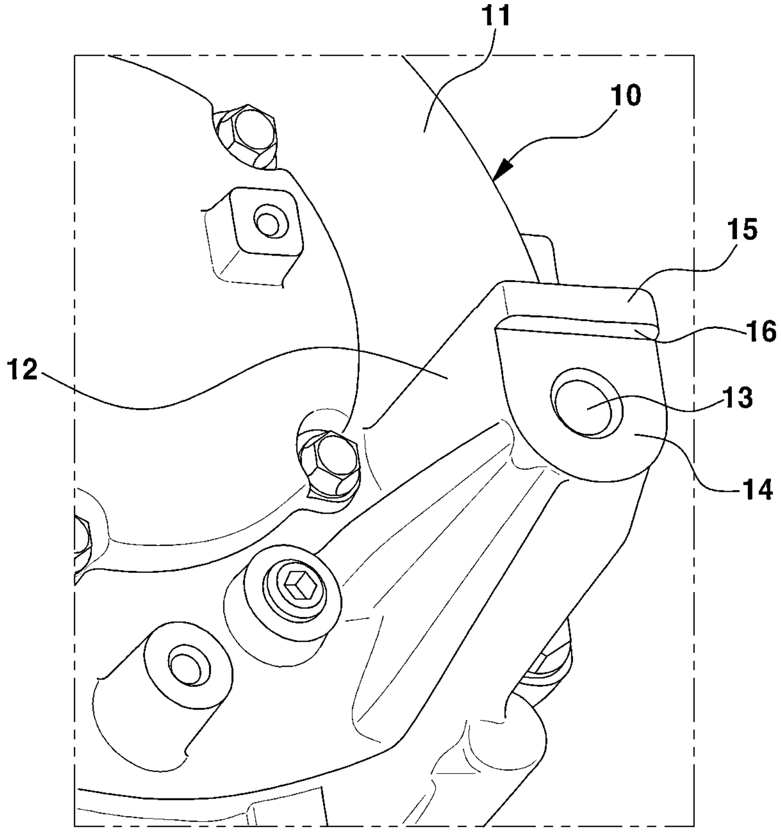
FIG. 8 is a perspective view showing a coupling part of a vehicle-mounted device to which the mount according to the embodiment of the present disclosure is coupled.

FIG. 8 is a perspective view showing a coupling part 12, which is a mounting portion of a vehicle-mounted device 10 coupled to the mount 100 according to the embodiment of the present disclosure. FIG. 8 shows the coupling part 12 (e.g., a boss) formed on a motor among the vehicle-mounted devices forming the PE system. FIG. 9 is a cross-sectional view showing a state in which the mount 100 according to the embodiment of the present disclosure and the coupling part 12 of the motor, which is the vehicle-mounted device 10, are coupled by a bolt 30.

FIG. 10 is a view showing a state in which the mount 100 according to the embodiment of the present disclosure is press-fitted into the mounting hole 22 of the vehicle body side portion 21. FIG. 11 is a perspective view showing a state in which the vehicle-mounted device 10 is mounted on the vehicle body side portion 21 using the mount 100 according to the embodiment of the present disclosure.

As a coupling part coupled to the mount 100 in the motor, which is the vehicle-mounted device 10, a boss 12 is formed to protrude from a motor housing 11. The boss 12 has a coupling hole 13 formed therein and configured to allow the end of the bolt 30 to be inserted thereinto and coupled thereto. The end of the bolt 30 passes through a hole of the mount 100 (i.e., the shaft insertion hole 111 of the inner pipe 110 of the mount 100) and is inserted and coupled to the coupling hole 13. A screw thread is machined on the inner circumferential surface of the coupling hole 13 so that the bolt 30 is screwed thereinto.

At a portion above the coupling hole 13 formed in the coupling part (boss) 12 of the motor, which is the vehicle-mounted device 10, a locking jaw part 15 is formed. The locking jaw part 15 is formed to protrude so as to be locked downwards on an upper surface of an end of the flat portion 113 in the inner pipe 110 of the mount 100, i.e., an upper surface 113*a* of an end of the flat portion 113. The end of the flat portion 113 being exposed to the outside of the insulator 120.

The locking jaw part 15 formed to protrude from the coupling part 12 of the motor 10 is formed to have a shape capable of being in surface contact with the upper surface of the inner pipe 110 of the mount 100. Specifically, the coupling part 12 of the motor 10 is formed to have a shape capable of being in surface contact with the upper surface 113*a* of the end of the flat portion 113 that is exposed to the outside of the insulator 120.

In this case, the locking jaw part 15 is formed to protrude toward the mount 100 and formed at a portion above a coupling surface 14 of the coupling part 12. The coupling surface 14 is a surface configured to allow the end surface of the inner pipe 110 to be seated thereon and to be in contact therewith. Further, a lower surface 16 of the locking jaw part 15 is a horizontal surface perpendicular to the coupling surface 14 having a vertical surface.

According to this structure, when the motor 10 is assembled, the locking jaw part 15 of the motor housing 11 may be locked downwards in a state of being seated on the upper surface 113*a* of the end of the flat portion 113 of the inner pipe 110 in the mount 100. The mount 100 is press-fitted into the mounting hole 22 of the vehicle body side portion 21. Further, in a state in which the lower surface 16 of the locking jaw part 15 and the upper surface 113*a* of the flat portion 113 are in surface contact with each other, the coupling part (boss) 12 of the motor 10 may be supported by the inner pipe 110 of the mount 100 (refer to FIG. 10).

As described above, when the bolt 30 is assembled, even if a torque load is applied by the bolt 30 passing through the shaft insertion hole 111 of the inner pipe 110, i.e., hole of the mount 100, in the state in which the lower surface 16 of the locking jaw part 15 of the coupling part 12 of the motor housing 11 is in surface contact with the upper surface 113*a* of the flat portion 113 of the inner pipe 110 of the mount 100 (refer to FIGS. 9 and 10), rotation of the inner pipe 110 may be prevented. The rotation of the inner pipe 110 may be prevented by the surface contact between the locking jaw part 15 of the motor 10, which is the vehicle-mounted device, and the flat portion 113 of the inner pipe 110. As a result, rotation of the insulator 120 may be prevented. Accordingly, forced tension of the insulator 120 is prevented, thereby advantageously solving a durability problem of the related art.

In addition, when the mount 100 according to the embodiment of the present disclosure is applied, hole alignment may be performed so that the coupling hole 13 of the motor housing 11 and the shaft insertion hole 111 of the mount 100 are aligned with each other in the state in which the locking jaw part 15 of the motor housing 11 is seated on the upper surface 113*a* of the end of the flat portion 113 formed on the inner pipe 110 of the mount 100. Accordingly, compared to the prior art, there is an advantage in that hole alignment becomes easier and assembly performance is improved.

Further, as described above, the flat portion 113 is formed on the upper portion of the inner pipe 110 in the mount 100. Accordingly, when the mount 100 is press-fitted into the mounting hole 22 of the vehicle body side portion 20 such as a bracket of a subframe, it is easy to distinguish between the top of the mount and the bottom thereof. As a result of this configuration, assembly performance is improved.

Figure 12:
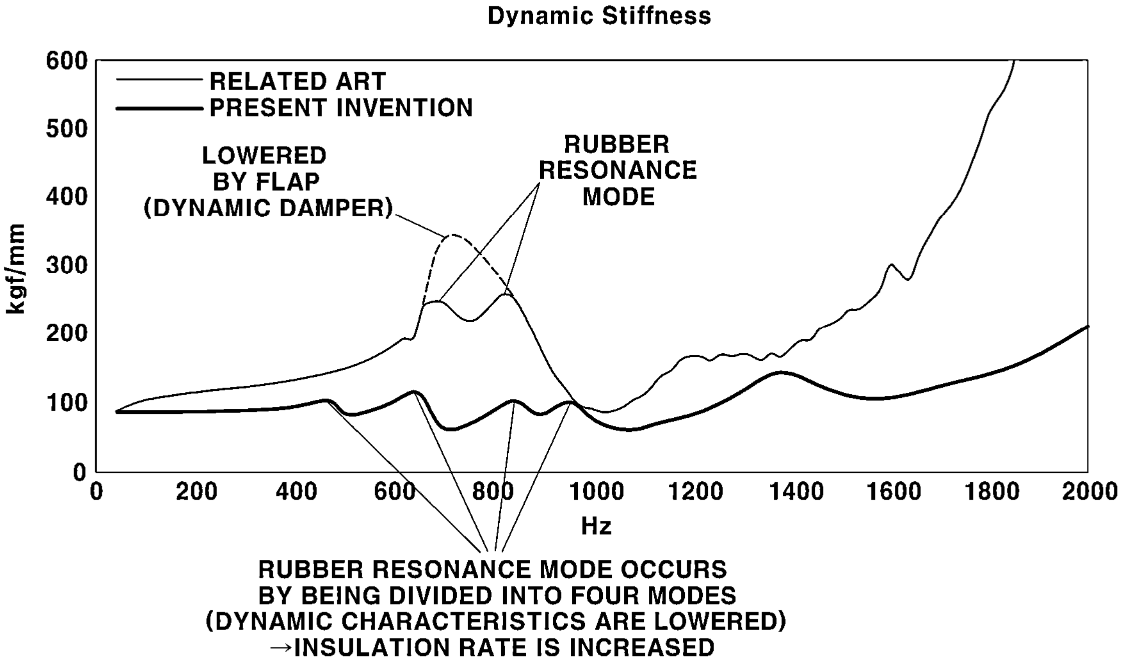
FIG. 12 is a view showing a comparison between the dynamic stiffness of the mount according to the embodiment of the present disclosure and the dynamic stiffness of the conventional mount.

FIG. 12 is a view showing a comparison between dynamic stiffness of the mount according to the embodiment of the present disclosure and dynamic stiffness of the conventional mount. FIG. 12 illustrates a graph showing dynamic stiffness according to frequency.

In FIG. 12, the mounts shown in FIGS. 1 and 4 are compared, and each of the mounts is a flap-type mount having a flap (reference numeral "122" in FIG. 4). While the conventional mount 1 has a vertically symmetrical shape as shown in FIG. 1, the mount 100 according to the embodiment of the present disclosure has different upper and lower shapes of the inner pipe 110 related to whine noise, as shown in FIG. 4.

Accordingly, in the mount 100 according to the embodiment of the present disclosure, as shown in FIG. 12, a rubber resonance mode and a dynamic stiffness peak are divided and generated at several frequencies, and the energy values thereof are reduced.

As a result, the mount 100 according to the embodiment of the present disclosure has an effect of increasing an insulation rate against whine noise while lowering dynamic characteristics of the insulator 120.

As is apparent from the above description, the present disclosure provides a vehicle mount and a method of manufacturing the vehicle mount having an effect of simultaneously achieving improvement in assembly performance, durability, and dynamic characteristics.

Although the embodiments of the present disclosure have been described in detail above, the scope of the present disclosure is not limited thereto. Various modifications and improvements made by those having ordinary skill in the art using the basic technical concept of the present disclosure defined in the following claims are also included in the scope of the present disclosure.

What is claimed is:

1. A vehicle mount comprising:

an inner pipe coupled to a vehicle-mounted device;

an outer pipe disposed outside the inner pipe and coupled to a vehicle body side portion; and an insulator interposed between the inner pipe and the outer pipe, wherein the inner pipe has a flat portion with a curved portion formed adjacent to the flat portion, and wherein the flat portion is formed on an entire area of a horizontal plane of an upper outer surface thereof, the upper outer surface having a flat horizontal surface and being coupled to the insulator.

2. The vehicle mount of claim 1, wherein the inner pipe is provided in a hollow pipe shape with a circular cross shape, and wherein an upper outer surface section corresponding to the flat portion in a cross-sectional shape of the inner pipe is a horizontal straight section.

3. The vehicle mount of claim 1, wherein the inner pipe has a shaft insertion hole formed to pass therethrough in an axial direction of the inner pipe, wherein the shaft insertion hole allows a bolt coupled to the vehicle-mounted device to pass therethrough.

4. The vehicle mount of claim 3, wherein the inner pipe has a plurality of pipe through-holes disposed around the shaft insertion hole in cross-section, and wherein the plurality of pipe through-holes are formed to pass through the inner pipe in the axial direction of the inner pipe.

5. The vehicle mount of claim 3, wherein the vehicle-mounted device has a coupling hole formed in a coupling part thereof, wherein the coupling part serves as a mounting portion of the vehicle-mounted device, and wherein the coupling hole allows an end of the bolt passing through the shaft insertion hole of the inner pipe to be inserted and screwed thereinto.

6. The vehicle mount of claim 3, wherein the flat portion of the inner pipe has an end exposed to an outside of the insulator.

7. The vehicle mount of claim 6, wherein the vehicle-mounted device has a locking jaw part formed at a portion above a coupling hole configured to allow the bolt to be coupled thereto in a coupling part serving as a mounting portion, and wherein the locking jaw part is formed to protrude so as to be locked downwards on the exposed end of the flat portion.

8. The vehicle mount of claim 7, wherein the locking jaw part is formed at a portion above a coupling surface of the coupling part and formed to protrude toward the vehicle mount, wherein the coupling surface allows an end surface of the inner pipe to be seated thereon and to be in contact therewith, and wherein the locking jaw part has a lower surface formed as a horizontal surface, wherein the lower surface is locked downwards on an upper surface of the exposed end of the flat portion in a state of being seated on the upper surface.

9. The vehicle mount of claim 8, wherein the coupling surface of the coupling part is formed as a vertical surface perpendicular to the lower surface of the locking jaw part.

10. The vehicle mount of claim 1, wherein the vehicle-mounted device is a motor configured to drive a vehicle.

11. A method of manufacturing a vehicle mount, the method comprising:

providing an inner pipe coupled to a vehicle-mounted device and an outer pipe coupled to a vehicle body side portion; and integrally forming, by vulcanization molding, an insulator interposed between the inner pipe and the outer pipe in a state in which the outer pipe is disposed outside the inner pipe, wherein the inner pipe is manufactured to have a flat portion with a curved portion formed adjacent to the flat portion, and wherein the flat portion is formed on an entire area of a horizontal plane of an upper outer surface thereof, the upper outer surface having a flat horizontal surface and being coupled to the insulator.

12. The method of claim 11, wherein the inner pipe is manufactured by extrusion molding.

13. The method of claim 11, wherein the inner pipe is manufactured in a hollow pipe shape with a circular cross shape, and wherein an upper outer surface section corresponding to the flat portion in a cross-sectional shape of the inner pipe is manufactured to be a horizontal straight section.

14. The method of claim 11, wherein a shaft insertion hole is formed to pass through the inner pipe in an axial direction of the inner pipe, and wherein the shaft insertion hole allows a bolt coupled to the vehicle-mounted device to pass therethrough.

15. The method of claim 14, wherein a plurality of pipe through-holes disposed around the shaft insertion hole in cross-section are formed in the inner pipe, and wherein the plurality of pipe through-holes are formed to pass through the inner pipe in the axial direction of the inner pipe.

16. The method of claim 11, wherein the insulator is molded so that an upper surface of an end of the flat portion of the inner pipe is exposed to an outside of the insulator, and wherein a locking jaw part of the vehicle-mounted device is locked downwards on the upper surface of the end of the flat portion in a state of being seated and supported on the upper surface.

17. A vehicle mount comprising:

an inner pipe coupled to a vehicle-mounted device;

an outer pipe disposed outside the inner pipe and coupled to a vehicle body side portion; and an insulator interposed between the inner pipe and the outer pipe, wherein the inner pipe has a flat portion with a curved portion formed adjacent to the flat portion, wherein the flat portion is formed on an entire area of a horizontal plane of an upper outer surface thereof, the upper outer surface having a flat horizontal surface and being coupled to the insulator, and wherein, other than the flat portion, a remaining portion of the inner pipe has a hollow pipe shape with a circular cross-section.

* * * * *